United States Patent
Chang et al.

(10) Patent No.: US 10,384,942 B2
(45) Date of Patent: Aug. 20, 2019

(54) HALOGEN DOPED PHOSPHORUS NANOPARTICLES AND MANUFACTURING METHOD THEREOF

(71) Applicant: National Tsing Hua University, Hsinchu (TW)

(72) Inventors: Wei-Chung Chang, Hsinchu (TW); Kuan-Wei Tseng, Hsinchu (TW); Hsing-Yu Tuan, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 15/865,637

(22) Filed: Jan. 9, 2018

(65) Prior Publication Data

US 2019/0062161 A1 Feb. 28, 2019

(30) Foreign Application Priority Data

Aug. 25, 2017 (TW) .............. 106129056 A

(51) Int. Cl.
| | |
|---|---|
| *C01B 25/00* | (2006.01) |
| *C01B 25/08* | (2006.01) |
| *H01M 4/62* | (2006.01) |
| *C01B 7/00* | (2006.01) |
| *H01M 4/58* | (2010.01) |
| *C01B 25/455* | (2006.01) |

(52) U.S. Cl.
CPC .............. *C01B 25/003* (2013.01); *C01B 7/00* (2013.01); *C01B 25/08* (2013.01); *H01M 4/5805* (2013.01); *H01M 4/624* (2013.01); *C01B 25/455* (2013.01); *C01P 2002/54* (2013.01); *C01P 2004/64* (2013.01); *C01P 2006/40* (2013.01)

(58) Field of Classification Search
None
See application file for complete search history.

(56) References Cited

U.S. PATENT DOCUMENTS

| | | | | |
|---|---|---|---|---|
| 3,057,917 | A * | 10/1962 | Maier | C07F 9/52 502/331 |
| 7,384,680 | B2 * | 6/2008 | Bi | B01J 2/006 428/143 |
| 8,288,455 | B1 * | 10/2012 | Miller | C08J 3/212 523/218 |

(Continued)

FOREIGN PATENT DOCUMENTS

CN 101870712 A 10/2010

OTHER PUBLICATIONS

Wei-Chung Chang et al., Solution Synthesis of Iodine-Doped Red Phosphorus Nanoparticles for Lithium-Ion Battery Anodes, Nano Letters, 2017, p. 1240-p. 1247, 17, ACS Publications, American Chemical Society, Taiwan.

*Primary Examiner* — Katie L. Hammer
(74) *Attorney, Agent, or Firm* — Hauptman Ham, LLP

(57) ABSTRACT

Halogen-doped phosphorous nanoparticles and a manufacturing method thereof are provided. The manufacturing method includes a mixing process and a centrifugation or filtration process. The mixing process has the step of mixing a precursor with a reducing agent solution to form a mixed solution, the precursor is a halogen-based phosphide. Then, the mixed solution is centrifuged or filtrated to obtain the halogen-doped phosphorous nanoparticles.

16 Claims, 5 Drawing Sheets

(56) References Cited

U.S. PATENT DOCUMENTS

2008/0166484 A1* 7/2008 Smith .................... C08K 5/523
 427/385.5
2008/0258159 A1* 10/2008 Jun ........................ B82Y 30/00
 257/94

* cited by examiner

HALOGEN DOPED PHOSPHORUS NANOPARTICLES AND MANUFACTURING METHOD THEREOF

CROSS REFERENCE TO RELATED APPLICATION

This application claims priority to Taiwan Patent Application No. 106129056, filed on Aug. 25, 2017, which is incorporated herein by reference in its entirety.

FIELD OF INVENTION

The disclosure relates to a method for synthesizing red phosphorus nanoparticles and, more particularly, to a halogen-doped phosphorous nanoparticles and a manufacturing method thereof.

BACKGROUND OF INVENTION

Phosphorus is an important material used in lithium-ion battery, sodium ion batteries, potassium ion batteries, semiconductor packaging, and semiconductor components.

To increase conductivity of phosphorus-based electrodes, modified phosphorus uses different type of carbon-P composites, such as P-graphite, P-carbon black, P-porous carbon, P-carbon nanotubes (CNTs), P-graphene, and phosphorus-filled 3D carbon. Phosphorus-based conductive materials are generally mostly made by a vaporization-condensation method or a mechanical method (such as ball-milling and hand-grinding) to combine phosphorus with carbon for forming the carbon-P composites. In conventional technology, the above-mentioned methods need to be performed at higher reaction temperatures and require a longer reaction time, so that required manufacturing costs are higher and the carbon-P composites are not easily produced. In detail, at present, the carbon-P composites are prepared by the vaporization-condensation method, and the phosphorus is sublimated by heating to a high temperature environment of 450° C. to 500° C. to diffuse the phosphorus into porous carbon. Although the methods can significantly enhance the conductivity of phosphorus, it is difficult to control the amount of phosphorus vapor in the conventional technology, and is further difficult to control the diffusion amount of phosphorus into the porous carbon. In addition, the phosphorus of the carbon-P composites needs a high proportion of the low capacity carbon from 30% to 70%, in order to enhance the conductivity of phosphorus. The distribution of phosphorus in pores of carbon via the vaporization-condensation method is uncontrollable, and a loading ratio of phosphorus in the carbon-P composites is limited. Because the phosphorus easily spontaneously combusts at high temperatures, it is necessary to fill with an inert gas. Furthermore, a particle size of the carbon-P composites obtained by the vaporization-condensation method is larger than a common carbon-phosphorus particle, which results in poor conductivity of the carbon-P composites. Additionally, the mechanical method (such as ball-milling and hand-grinding) to prepare the carbon-P composites requires a long ball milling process, which takes about 12 hours to 24 hours. It is difficult to control a uniformity of a size of the carbon-P composites and result in broad sizes of particles of the carbon-P composites, and it is difficult to make small-sized carbon-P composites, and the carbon-P composites have poor conductivity.

Thus, a method to synthesize phosphorus by a solution phase chemical synthesis in the conventional technology has not been proposed. The carbon-P composites cannot be produced by the vaporization-condensation method or the mechanical method (such as ball-milling and hand-grinding) in large scale in an ambient environment. In order to meet the needs of the industry, the development of a reaction condition, such as in the ambient environment with a shorter reaction time preparation of nano-scale particles fabrication method, is the industry's current development needs of the technical field.

SUMMARY OF INVENTION

For the reasons mentioned above, the disclosure provides halogen-doped phosphorous nanoparticles and a manufacturing method thereof. In a typical reaction of the disclosure, a halogen-based phosphide compound (i.e. $PI_3$) was reduced by a reducing agent (i.e. ethylene glycol) to generate halogen-doped phosphorous nanoparticles in ambient environment. Around 3-5 wt % halogen (i.e. iodine) was found in the halogen-doped phosphorous nanoparticles, which was speculated the key to significantly improve a conductivity of the halogen-doped phosphorous nanoparticles. The conductivity of the halogen-doped phosphorous nanoparticles is higher than that of conventional phosphorus or carbon-P composites.

In one aspect of the disclosure, the method for manufacturing the halogen-doped phosphorous nanoparticles comprises steps of:

providing a precursor and a reducing agent, wherein the precursor is a halogen-based phosphide compound;

mixing the precursor with the reducing agent to form a mixed solution in which the precursor is reduced by the reducing agent; and centrifuging or filtering the mixed solution to obtain a halogen-doped phosphorous nanoparticle dispersion including the halogen-doped phosphorous nanoparticles.

In the method described above, the precursor can be a precursor solution or precursor particles. Namely, the precursor is in a solution state or a powder state. When the precursor is the precursor solution, the precursor solution is formed by mixing a first solvent with the precursor, and the first solvent is a solvent which is miscible with the precursor and inactive (i.e. reaction inert) with the precursor. The first solvent is selected from a group consisting of benzene, toluene, dichlorobenzene, fluorobenzene, chlorobenzene, bromobenzene, iodobenzene, and trimethylbenzene. When the precursor is the precursor particles, the precursor particles are added into the reducing agent to form the mixed solution.

In the method described above, the reducing agent comprises a second solvent having a reducing property to the halogen-based phosphide compound, and the second solvent is selected from a group consisting of polar aprotic solvents, diols, triols, ketone solvents, carboxylic acid ester solvents, long chain carbon solvents, and high boiling oil solvents. When the second solvent has a reducing property to the halogen-based phosphide compound, the second solvent is selected from a group consisting of ethylene glycol, glycerol, acetone, butanone, pentanone, ethyl acetate, tetrahydrofuran. The precursor including the second solvent described above is mixed with the reducing agent at a room temperature.

In the method described above, the reducing agent comprises a second solvent, and the second solvent is selected from a group consisting of long chain carbon solvents, and high boiling oil solvents. The second solvent is selected from N-methylpyrrolidone, 1,3-dimethyl-2-imidazolidinone, squalane, squalene, triphenylphosphine, trioctyl phosphate, dichlorobenzene, iodobenzene, or trimethylbenzene. In this embodiment, before mixing the precursor with the reducing agent, the second solvent is preheated to a temperature between 100° C. to 250° C.

In this embodiment, after mixing the precursor with the reducing agent, an intermediate product is obtained by directly centrifuging the mixed precursor and the reducing agent or the intermediate product is collected within a condenser tube. The intermediate product is reheated and then gasified and collected by the condenser tube. The mixed solution is obtained by dissolving the intermediate product in ethanol.

In the method described above, the reducing agent comprises a second solvent and an organic reducing agent, the second solvent has no reducing property to the halogen-based phosphide compound, the second solvent is selected from a group consisting of methanol, propanol and isopropanol, and the organic reducing agent is selected from a group consisting of lithium borohydride solution, sodium borohydride solution, potassium borohydride solution and lithium aluminum hydride solution.

In the method described above, the precursor is mixed with the reducing agent at a room temperature or an ambient temperature.

In the method described above, the reducing agent further comprises a surfactant containing at least one lipophilic group and at least one hydrophilic group, and the surfactant is selected from a group consisting of cetyl trimethy ammonium bromide (CTAB), oleic acid, hexadecane thiol, triphenylphosphine, trioctyl phosphate, and polyvinylpyrrolidone. The surfactant is used to control a shape and a particle size of the halogen-doped phosphorous nanoparticle.

In the method described above, the halogen-based phosphide compound is phosphorus halide and a formula of the phosphorus halide is $P_aX_b$, wherein P is phosphorus, X is halogen, "a" represents an integer of 1 to 2, and "b" represents an integer of 3 to 5. The phosphorus halide is selected from a group consisting of phosphorus trichloride, phosphorus pentachloride, phosphorus tribromide, phosphorus pentabromide, phosphorus triiodide, and phosphorus tetraiodide.

In the method described above, the halogen-doped phosphorous nanoparticles have a particle size within a range of 50 nm to 100 nm.

An objective of this disclosure is to further provide a halogen-doped phosphorous nanoparticle dispersion comprising halogen-doped phosphorous nanoparticles manufactured by the method for manufacturing halogen-doped phosphorous nanoparticles.

The disclosure provides the halogen-doped phosphorous nanoparticles and the manufacturing method thereof. The method can be performed in an ambient environment and the reaction process of the manufacturing method can be finished in a shorter reaction time. A particle size of the halogen-doped phosphorous nanoparticle synthesized by the manufacturing method of the disclosure is smaller than that of the conventional phosphorus or carbon-P composites. Moreover, compared to a conductivity of the conventional phosphorus or carbon-P composites, a conductivity of the halogen-doped phosphorous nanoparticles is significantly improved for being used solely as active materials for the lithium-ion battery anodes. It is not necessary to use carbon to enhance the conductivity of phosphorus.

These and other aspects of the disclosure will become apparent to those skilled in the art after a reading of the following description of the preferred embodiment when considered with the drawings.

DESCRIPTION OF DRAWINGS

To make the above embodiments of this disclosure more comprehensible, the preferred embodiments being adopted by this disclosure to achieve the above and other objectives can be best understood by referring to the following detailed description of the preferred embodiments and the accompanying drawings as detailed below.

DETAILED DESCRIPTION OF PREFERRED EMBODIMENTS

Figure 1:
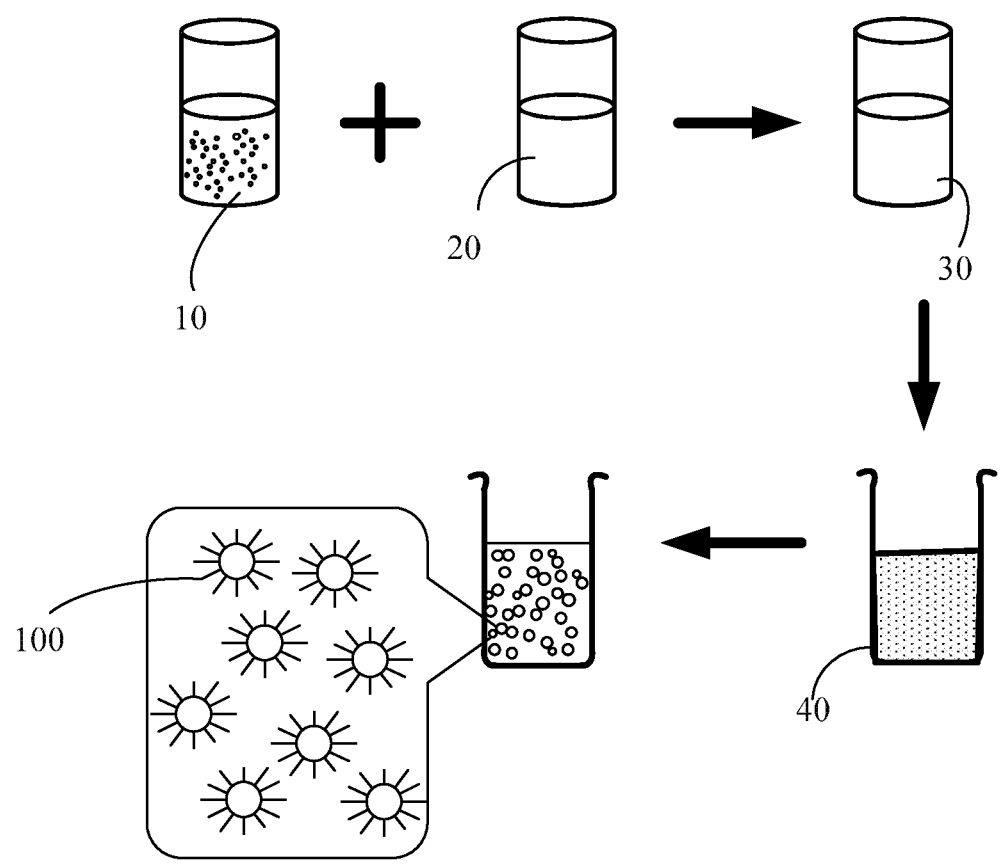
FIG. 1 is a flowchart of a method for manufacturing halogen-doped phosphorous nanoparticles according to a preferred embodiment of the disclosure.

Referring to the drawings of the disclosure, the same component is labeled as the same number. The following description is based on the particular illustrated embodiment of the disclosure, which should not be construed as limiting the disclosure.

Figure 2:
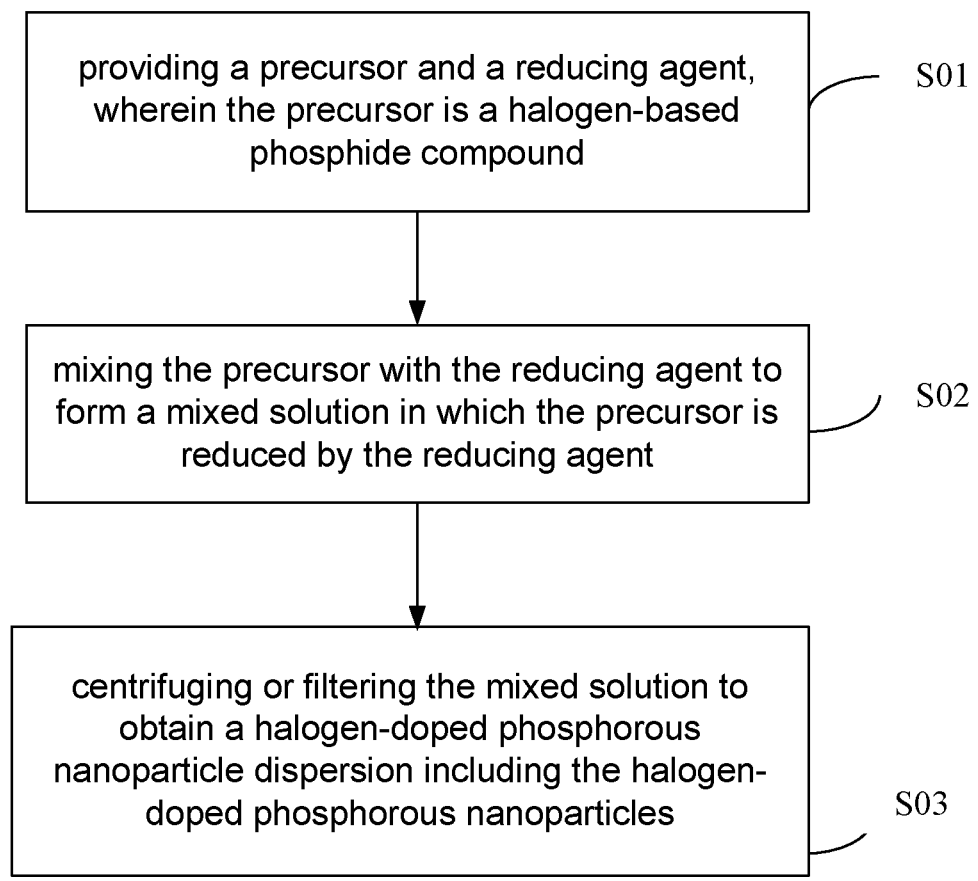
FIG. 2 is a schematic block diagram of the method for manufacturing the halogen-doped phosphorous nanoparticles according to the preferred embodiment of the disclosure.

Referring to FIG. 1 and FIG. 2, a flowchart of a method for manufacturing halogen-doped phosphorous nanoparticles according to a preferred embodiment of the disclosure and a schematic block diagram of the method for manufacturing the halogen-doped phosphorous nanoparticles according to the preferred embodiment of the disclosure are shown. The disclosure provides the method for preparing halogen-doped phosphorous nanoparticles, such as red phosphorus nanoparticles (RPNPs), doped with 3 to 5% by weight of halogen by a solution synthesis method. For example, iodine (halogen) is substituted for conventional carbonaceous materials to prepare 3 wt % to 5 wt % of iodine (halogen) red phosphorous nanoparticles.

As used herein, the term "halogen-doped phosphorous nanoparticles" refers to red phosphorus nanoparticles (RPNPs) or halogen-doped red phosphorous nanoparticles. As shown in FIG. 1, the preferred embodiment provides a method for manufacturing the halogen-doped phosphorous nanoparticles, which comprises following steps.

First, performing a mixing process. The step of performing the mixing process comprises following steps.

In a step S01, a precursor 10 and a reducing agent 20 are prepared. The precursor 10 is a halogen-based phosphide compound.

In a step S02, the precursor 10 is mixed with the reducing agent 20 to form a mixed solution 30 in which the precursor 10 is reduced by the reducing agent 20.

Secondly, performing a centrifugation or filtration process. The step of performing the centrifugation or filtration process comprises following steps.

In a step S03, the mixed solution 30 is centrifuged or filtered to obtain a halogen-doped phosphorous nanoparticle dispersion including the halogen-doped phosphorous nanoparticles 100.

In some embodiments, the precursor is a precursor solution. In other embodiments, the precursor is precursor particles. Namely, the precursor is in a solution state or a powder state. When the precursor is the precursor solution, the precursor solution is formed by mixing a first solvent with the precursor, and the first solvent is a solvent which is miscible with the precursor and inactive (i.e. reaction inert) with the precursor. The first solvent is selected from a group consisting of benzene, toluene, dichlorobenzene, fluorobenzene, chlorobenzene, bromobenzene, iodobenzene, and trimethylbenzene. When the precursor is the precursor particles, the precursor particles are added into the reducing agent to form the mixed solution.

The reducing agent comprises a second solvent having a reducing property to the halogen-based phosphide compound, and the second solvent is selected from a group consisting of polar aprotic solvents, diols, triols, ketone solvents, and carboxylic acid ester solvents. For example, the second solvent is selected from ethylene glycol, glycerol, acetone, butanone, pentanone, ethyl acetate, or tetrahydrofuran.

In this embodiment, the precursor is mixed with the reducing agent at a room temperature or an ambient temperature.

Figure 3:
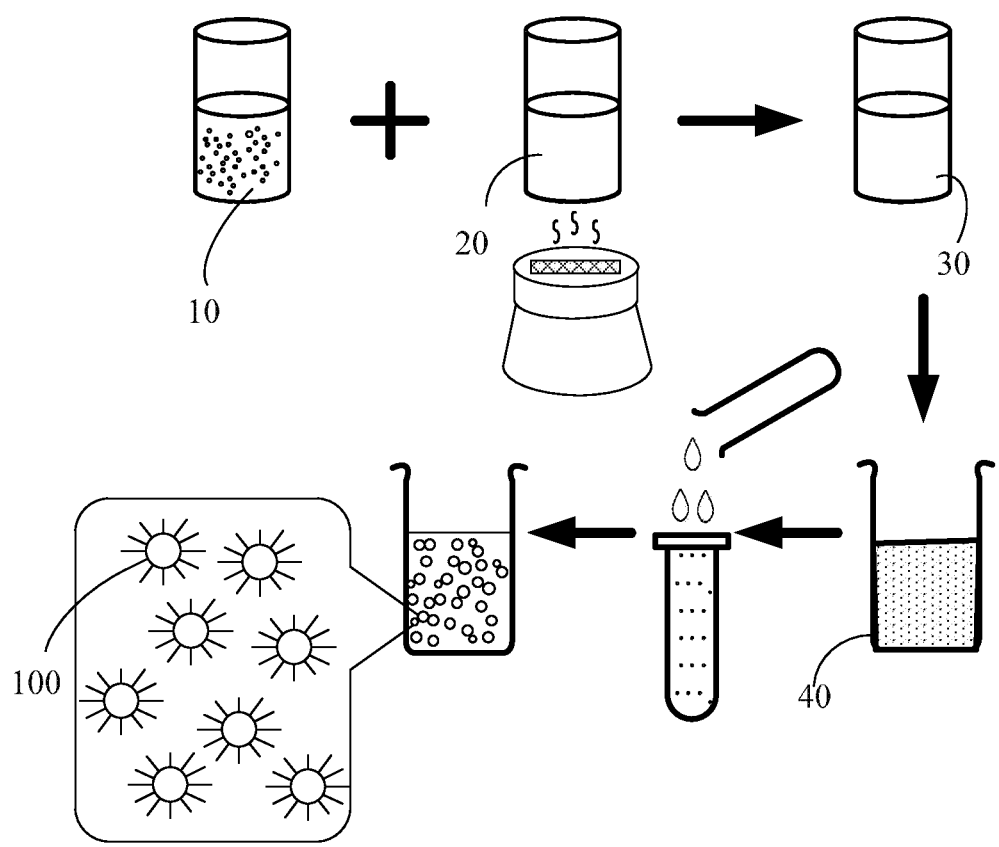
FIG. 3 is a flowchart of the method for manufacturing the halogen-doped phosphorous nanoparticles according to another preferred embodiment of the disclosure.
Figure 4:
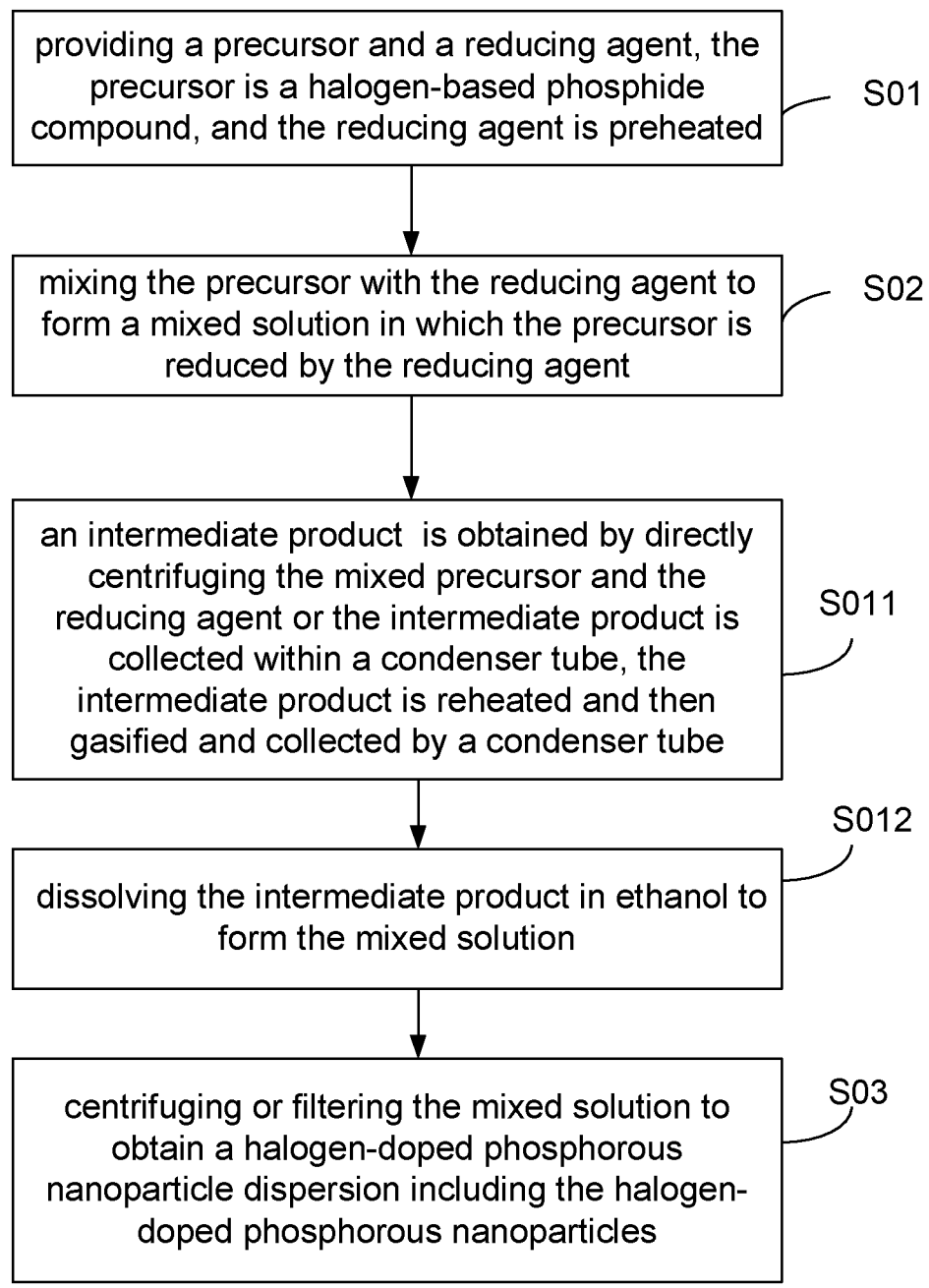
FIG. 4 is a schematic block diagram of the method for manufacturing the halogen-doped phosphorous nanoparticles according to another preferred embodiment of the disclosure.

Referring to FIGS. 3-4, a flowchart of the method for manufacturing the halogen-doped phosphorous nanoparticles according to another preferred embodiment of the disclosure and is a schematic block diagram of the method for manufacturing the halogen-doped phosphorous nanoparticles according to another preferred embodiment of the disclosure are shown. In the embodiment, the reducing agent comprises a second solvent, and the second solvent is selected from a group consisting of long chain carbon solvents, and high boiling oil solvents. In more detail, when the second solvent has a reducing property to the halogen-based phosphide compound and the second solvent is selected from long chain carbon solvents or high boiling oil solvents, such as N-methylpyrrolidone, 1,3-dimethyl-2-imidazolidinone, squalane, squalene, triphenylphosphine, trioctyl phosphate, dichlorobenzene, iodobenzene, and trimethylbenzene, the reducing agent comprising the long chain carbon solvents or high boiling oil solvents needs to be preheated.

Specifically, as shown in FIG. 3, since a boiling point of the second solvent (such as long chain carbon solvents and high boiling oil solvents) is higher, a reaction temperature of mixing the precursor with the reducing agent is carried out at a temperature between 100° C. and 250° C., preferably the temperature is 150° C. Alternatively, the reducing agent is preheated to a temperature between 100° C. to 250° C. before mixing the precursor with the reducing agent, preferably preheated to 150° C.

After the mix process, in a step S011, an intermediate product 40 is obtained by directly centrifuging the mixed precursor and the reducing agent or the intermediate product is collected within a condenser tube. The intermediate product 40 is reheated and then gasified and collected by a condenser tube (not shown). In a step S012, the mixed solution 30 is obtained by dissolving the intermediate product 40 in ethanol.

In other different embodiments, the reducing agent comprises a second solvent, the second solvent has no reducing property to the halogen-based phosphide compound, the second solvent is selected from a group consisting of methanol, propanol and isopropanol, and the organic reducing agent is selected from a group consisting of Lithium borohydride ($LiBH_4$) solution, sodium borohydride ($NaBH_4$) solution, potassium borohydride ($KBH_4$) solution and lithium aluminum hydride ($LiAlH_4$) solution. In this embodiment, since the second solvent does not have reducing property to the halogen-based phosphide compound, the reducing agent further comprises an organic reducing agent for providing the reducing property to the halogen-based phosphide compound. In this embodiment, the precursor is mixed with the reducing agent at a room temperature or an ambient temperature. In more detail, a reaction temperature at which the mixing process is carried out may be room temperature (in ambient environment) or any temperature at which a reaction rate of the mixing process can be increased.

In order to control a shape and a particle size of the halogen-doped phosphorous nanoparticle, a surfactant is used during the mixing process. The reducing agent further comprises the surfactant containing at least one lipophilic group and at least one hydrophilic group, and the surfactant is selected from a group consisting of cetyl trimethy ammonium bromide (CTAB), oleic acid, hexadecane thiol, triphenylphosphine, trioctyl phosphate, and polyvinylpyrrolidone. The surfactant is used to control a crystallization of the halogen-doped phosphorous nanoparticles, thereby controlling the shape and the particle size of the halogen-doped phosphorous nanoparticle and preventing the crystallization of the halogen-doped phosphorous nanoparticle oversized.

Preferably, the halogen-based phosphide compound is phosphorus halide and a formula of the phosphorus halide is $P_aX_b$, wherein P is phosphorus, X is halogen, "a" represents an integer of 1 to 2, and "b" represents an integer of 3 to 5. The phosphorus halide is selected from a group consisting of phosphorus trichloride, phosphorus pentachloride, phosphorus tribromide, phosphorus pentabromide, phosphorus triiodide, and phosphorus tetraiodide. In a preferred embodiment, a phosphorus source of the halogen-based phosphide compound is red phosphorus (RP).

The halogen-doped phosphorous nanoparticle dispersion, which is the mixed solution after centrifuged or filtered, is washed several times with a washing solvent to remove the excess reducing agent and the excess solvent mentioned above on a surface of the halogen-doped phosphorous nanoparticle. Then, the halogen-doped phosphorous nanoparticle dispersion is heated or preformed a high temperature treatment for removing the excess of the above-mentioned solvent or by-products coated on the halogen-doped phosphorous nanoparticles. Subsequently, the halogen-doped phosphorous nanoparticle dispersion is dried for obtaining the halogen-doped phosphorous nanoparticles in a solid phase, such as halogen-doped phosphorous nanoparticle powders. The halogen-doped phosphorous nanoparticles are composed of 3 wt % to 5 wt % halogen doped with 97 wt % to 95 wt % red phosphorus. More specifically, a composition of the halogen-doped phosphorous nanoparticles can be referred to Table 1 below:

TABLE 1 elemental compositions of RPNPs

| | Element | | | | |
|---|---|---|---|---|---|
| | Phosphorus(P) | Carbon(C) | Oxygen(O) | Iodine(I) | TOTAL |
| Weight percent (%) | 83.84 | 10.32 | 1.12 | 4.72 | 100.00 |

Example

Materials

Phosphorus triiodide ($PI_3$, 99%), cetyltrimethylammonium bromide (CTAB, 99%), anhydrous ethylene glycol (99.8%), anhydrous toluene (99.99%), ethanol (99.8%), poly (acrylic acid) (PAA, average $Mv \approx 3000000$), silicon powder 99% and germanium powder 99.999% were purchased from Sigma-Aldrich. Iodobenzene (98%) and red phosphorus powder (98.9%) were purchased from Alfa Aesar. Electrolyte (1M $LiPF_6$ in fluoroethylene carbonate/diethyl carbonate (FEC/DEC) (1:1 vol %)), lithium hexafluorophosphate ($LiPF_6$), copper metal foil (0.01 mm), lithium metal foil (99.9%), celgard membrane, super P carbon black, coin-type cell CR2032 were purchased from shining energy. Commercial $Li(Ni_{0.5}Co_{0.3}Mn_{0.2})O_2$ (NCM-532) cathode materials were purchased from vista advance technology. The components of pouch type battery were purchased from MTI Shenzhen kejingtar technology.

Phosphorus triiodide ($PI_3$ solution) is used as the halogen-based phosphide compound (as the precursor). Cetyltrimethylammonium bromide (CTAB solution) is used as the surfactant. Anhydrous ethylene glycol (99.8%) is used as the second solvent (as the reducing agent). Anhydrous toluene (99.99%) is used as the first solvent.

Methods

In this exemplary example, $PI_3$ solution in iodobenzene (1.5 M) was injected into CTAB solution in ethylene glycol (0.016 M) under vigorous stirring (1050 rpm) for 5 min. After the reaction, the obtained mixed solution were purified by 8000 rpm centrifugation using toluene and ethanol (1:2 vol %). The collected halogen-doped phosphorous nanoparticle dispersion were then disperse in ethanol and stirred to remove the residual ethylene glycol and byproducts. The dispersion was centrifuged at 8000 rpm for 5 min to collect the halogen-doped phosphorous nanoparticles (RPNPs). The halogen-doped phosphorous nanoparticles were then stored in an argon-filled glove box. The yield of RPNPs, based on an amount of P atoms in $PI_3$ solution, was approximately 20%.

In a typical reaction, $PI_3$ solution was reduced by ethylene glycol to generate the halogen-doped phosphorous nanoparticles in the presence of CTAB solution. The halogen-doped phosphorous nanoparticles, such as red phosphorus nanoparticles (RPNPs), with uniform size and near-spherical morphology could be facilely synthesized at a room temperature using a solution-phase synthesis. The reaction of the solution-phase synthesis involved the reduction of $PI_3$ with ethylene glycol in the presence of CTAB. Briefly, in this exemplary example, $PI_3$ was used as a source of phosphorus, and ethylene glycol served as a reducing agent, while CTAB acted as a surfactant to limit the growth of phosphorus to form the phosphorus nanoparticles. Without the use of CTAB, the growth of phosphorus is uncontrollable, resulting in the formation of bulky red phosphorus crystals.

Results

Figure 5:
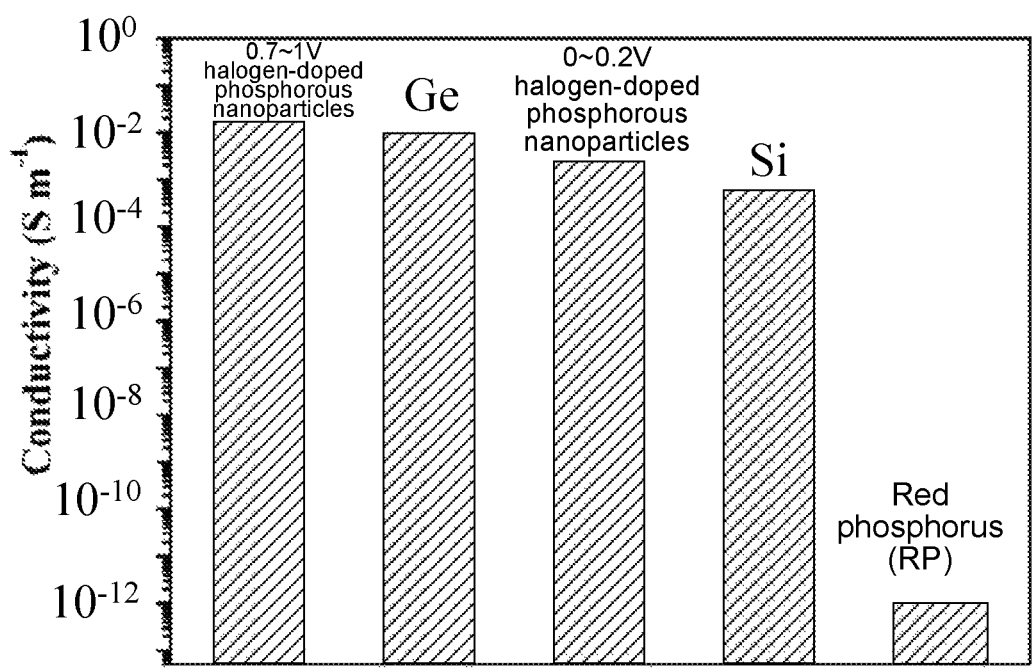
FIG. 5 is a comparison diagram of a conductivity of the halogen-doped phosphorous nanoparticles according to the preferred embodiment of the disclosure and a conductivity of other materials.

Referring to FIG. 5, a comparison diagram of a conductivity of the halogen-doped phosphorous nanoparticles according to the preferred embodiment of the disclosure and a conductivity of other materials is shown. The iodine (3-5%) was doped into the halogen-doped phosphorous nanoparticles. A conductivity of RPNPs is $10^{10}$ times higher than that of conventional phosphorus, 100 times higher than that of Si, and slightly lower than that of Ge. Resistivity and conductivity values of RPNPs, Ge, Si and conventional red phosphorus (RP) are referred to Table 2 below:

TABLE 2 resistivity and conductivity values of RPNPs, Ge, Si and conventional red phosphorus (RP)

| Materials | Resistivity ($\Omega$*m) | conductivity (S $m^{-1}$) | Density of pellet (g $cm^{-3}$) |
|---|---|---|---|
| Ge | $9.78*10^1$ | $1.02*10^{-2}$ | 4.14 |
| RPNPs | $3.81*10^2 \sim 5.54*10^1$ | $2.62*10^{-3} \sim 1.81*10^{-2}$ | 1.77 |
| Si | $1.87*10^3$ | $5.35*10^{-4}$ | 1.73 |
| RP | $1.00*10^{12}$ | $1.00*10^{-12}$ | 1.79 |

As the above Table 2 shown, the halogen (e.g., iodine) doped in the halogen-doped phosphorous nanoparticles can increase the conductivity of the nanoparticles. Iodine was found in RPNPs, which plays a key role in the enhancement of conductivity of the nanoparticles (such as RPNPs).

Furthermore, Iodine has been demonstrated as an important dopant and has been applied in conducting polymers to improve the conductivity. In addition, iodine doping can also increase the conductivity of other materials such as carbon nanotubes and graphene. The conductivity improved by iodine doping is the enhanced density of mobile holes. The drastically increased conductivity of RPNPs was expected to facility the diffusion of electrons and lithium ions, leading to ultrahigh rate capability and stable cycling performance in lithium-ion battery. Therefore, the halogen-doped phosphorous nanoparticles can be solely used as anode materials for lithium-ion batteries without forming conventional carbon-P composites and show very good battery performance. The improvement of conductivity and uniform nanosized morphology gives the halogen-doped phosphorous nanoparticles (such as RPNPs) good cycle stability and excellent ultrahigh rate capability in lithium-ion batteries. Finally, using RPNPs as anode materials is suitable for replacing the conventional carbon-P composites as the anode material of the lithium-ion batteries.

As described above, the disclosure provides the halogen-doped phosphorous nanoparticles and the manufacturing method thereof. The method comprises a solution-phase synthesis process to synthesizing the halogen-doped phosphorous nanoparticles (such as RPNPs) in large scale in an ambient environment. Around 3 wt %-5 wt % halogen (i.e. iodine) was found in the halogen-doped phosphorous nanoparticles, which was speculated the key to significantly improve a conductivity of the halogen-doped phosphorous nanoparticles. The halogen-doped phosphorous nanoparticles can replace the conventional phosphorus or carbon-P composites for applying to semiconductor elements, lithium battery electrodes, potassium ion batteries, sodium ion battery electrodes, or product modification, such as changing a structure (3D porous nanoarchitecture), coated on a conductive layer and other purposes. Moreover, compared to a conductivity of the conventional phosphorus or carbon-P composites, a conductivity of the halogen-doped phosphorous nanoparticles is significantly improved for being used solely as active materials for the lithium-ion battery anodes. It is not necessary to use carbon to enhance the conductivity of phosphorus.

The disclosure has been described with preferred embodiments thereof, and it is understood that many changes and modifications to the described embodiment can be carried out without departing from the scope and the spirit of the invention that is intended to be limited only by the appended claims.

What is claimed is:

1. A method for manufacturing halogen-doped phosphorous nanoparticles, comprising steps of:
providing a precursor and a reducing agent, wherein the precursor is a halogen-based phosphide compound;
mixing the precursor with the reducing agent to form a mixed solution in which the precursor is reduced by the reducing agent; and
centrifuging or filtering the mixed solution to obtain a halogen-doped phosphorous nanoparticle dispersion including the halogen-doped phosphorous nanoparticles.

2. The method for manufacturing halogen-doped phosphorous nanoparticles according to claim 1, wherein the precursor is a precursor solution, the precursor solution is formed by mixing a first solvent with the precursor, and the first solvent is a solvent which is miscible with the precursor and inactive with the precursor.

3. The method for manufacturing halogen-doped phosphorous nanoparticles according to claim 2, wherein the first solvent is selected from the group consisting of benzene, toluene, dichlorobenzene, fluorobenzene, chlorobenzene, bromobenzene, iodobenzene, and trimethylbenzene.

4. The method for manufacturing halogen-doped phosphorous nanoparticles according to claim 1, wherein the precursor are precursor particles, and the precursor particles are added into the reducing agent to form the mixed solution.

5. The method for manufacturing halogen-doped phosphorous nanoparticles according to claim 1, wherein the reducing agent comprises a second solvent, the second solvent has a reducing property to the halogen-based phosphide compound, and the second solvent is selected from the group consisting of polar aprotic solvents, diols, triols, ketone solvents, carboxylic acid ester solvents.

6. The method for manufacturing halogen-doped phosphorous nanoparticles according to claim 5, wherein the second solvent is selected from the group consisting of ethylene glycol, glycerol, acetone, butanone, pentanone, ethyl acetate, tetrahydrofuran.

7. The method for manufacturing halogen-doped phosphorous nanoparticles according to claim 6, wherein the precursor is mixed with the reducing agent at a room temperature.

8. The method for manufacturing halogen-doped phosphorous nanoparticles according to claim 1, wherein the reducing agent comprises a second solvent, the second solvent is selected from the group consisting of long chain carbon solvents, and oil solvents.

9. The method for manufacturing halogen-doped phosphorous nanoparticles according to claim 8, wherein the second solvent is selected from the group consisting of N-methyl pyrrolidone, 1,3-dimethyl-2-imidazolidinone, squalane, squalene, triphenylphosphine, trioctyl phosphate, dichlorobenzene, iodobenzene, and trimethylbenzene.

10. The method for manufacturing halogen-doped phosphorous nanoparticles according to claim 9, wherein before mixing the precursor with the reducing agent, the second solvent is preheated to a temperature between 100° C. to 250° C.

11. The method for manufacturing halogen-doped phosphorous nanoparticles according to claim 1, wherein the reducing agent comprises a second solvent the second solvent has no reducing property to the halogen-based phosphide compound, the second solvent is selected from the group consisting of methanol, propanol and isopropanol, and wherein the reducing agent further comprises an organic reducing agent, and the organic reducing agent is selected from the group consisting of lithium borohydride solution, sodium borohydride solution, potassium borohydride solution and lithium aluminum hydride solution.

12. The method for manufacturing halogen-doped phosphorous nanoparticles according to claim 11, wherein the precursor is mixed with the reducing agent at a room temperature.

13. The method for manufacturing halogen-doped phosphorous nanoparticles according to claim 1, wherein the reducing agent further comprises a surfactant containing at least one lipophilic group and at least one hydrophilic group, and the surfactant is selected from the group consisting of cetyl trimethy ammonium bromide (CTAB), oleic acid, hexadecane thiol, triphenylphosphine, trioctyl phosphate, and polyvinylpyrrolidone.

14. The method for manufacturing halogen-doped phosphorous nanoparticles according to claim 1, wherein the halogen-based phosphide compound is phosphorus halide and a formula of the phosphorus halide is $P_aX_b$, wherein P is phosphorus, X is halogen, "a" represents an integer of 1 to 2, and "b" represents an integer of 3 to 5.

15. The method for manufacturing halogen-doped phosphorous nanoparticles according to claim 14, wherein the phosphorus halide is selected from the group consisting of phosphorus trichloride, phosphorus pentachloride, phosphorus tribromide, phosphorus pentabromide, phosphorus triiodide, and phosphorus tetraiodide.

16. The method for manufacturing halogen-doped phosphorous nanoparticles according to claim 1, wherein the halogen-doped phosphorous nanoparticles have a particle size within a range of 50 nm to 100 nm.

* * * * *